(12) United States Patent
Leonardo et al.

(10) Patent No.: US 8,438,050 B2
(45) Date of Patent: *May 7, 2013

(54) METHOD AND SYSTEM FOR FILING A COMPLAINT RELATED TO NETWORK-BASED TRANSACTIONS

(75) Inventors: Lou Leonardo, Aptos, CA (US); Gurinder Singh Grewal, Fremont, CA (US); Robert J. Ratterman, Villa Hills, KY (US); Joshua D. Knepfle, Cincinnati, OH (US); Randy Ching, Mountain View, CA (US); Tola Dalton, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/523,461

(22) Filed: Jun. 14, 2012

(65) Prior Publication Data

US 2012/0253854 A1    Oct. 4, 2012

Related U.S. Application Data

(63) Continuation of application No. 12/987,822, filed on Jan. 10, 2011, now Pat. No. 8,209,228, which is a continuation of application No. 09/583,216, filed on May 30, 2000, now Pat. No. 7,877,278.

(51) Int. Cl.
*G06Q 10/00* (2012.01)

(52) U.S. Cl.
USPC .............. 705/4; 705/309; 705/30; 705/26.1; 705/333

(58) Field of Classification Search .............. 705/4, 309, 705/26.1, 1.1, 26.3, 41, 80
See application file for complete search history.

(56) References Cited

U.S. PATENT DOCUMENTS

| | | | |
|---|---|---|---|
| 3,573,747 A | 4/1971 | Adams et al. |
| 3,581,072 A | 5/1971 | Nymeyer |
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,823,265 A | 4/1989 | Nelson |
| 4,903,201 A | 2/1990 | Wagner |

(Continued)

FOREIGN PATENT DOCUMENTS

| | | |
|---|---|---|
| CA | 2253543 A1 | 3/1997 |
| FR | 2658635 A1 | 8/1991 |

(Continued)

OTHER PUBLICATIONS

"U.S. Appl. No. 09/711,578, Notice of Allowance mailed Dec. 24, 2012", 8 pgs.

"U.S. Appl. No. 12/826,504, Non Final Office Action mailed Dec. 6, 2012", 9 pgs.

Greenemeir, Larry, "Performance or your money back . . . offer refunds in case of failures", Information Week, Issue 802, (Sep. 4, 2000), p. 90.

"U.S. Appl. No. 09/583,216, 312 Amendment mailed Nov. 1, 2010", 11 pgs.

(Continued)

*Primary Examiner* — Vanel Frenel
(74) *Attorney, Agent, or Firm* — Schwegman, Lundberg & Woessner, P.A.

(57) ABSTRACT

A method and system that allows a user to file a complaint related to a transaction completed over a network-based transaction facility. For example, a method can include the following operations conducted via a server: receiving a complaint from a first party, communicating information about the complaint to a second party, enabling an exchange of information regarding the complaint, and determining whether a criterion required for approval of the request for compensation has been satisfied.

20 Claims, 24 Drawing Sheets

U.S. PATENT DOCUMENTS

| | | | |
|---|---|---|---|
| 5,063,507 | A | 11/1991 | Lindsey et al. |
| 5,077,665 | A | 12/1991 | Silverman et al. |
| 5,101,353 | A | 3/1992 | Lupien et al. |
| 5,136,501 | A | 8/1992 | Silverman et al. |
| 5,168,446 | A | 12/1992 | Wiseman |
| 5,205,200 | A | 4/1993 | Wright |
| 5,243,515 | A | 9/1993 | Lee |
| 5,258,908 | A | 11/1993 | Hartheimer et al. |
| 5,280,422 | A | 1/1994 | Moe et al. |
| 5,297,031 | A | 3/1994 | Gutterman et al. |
| 5,297,032 | A | 3/1994 | Trojan et al. |
| 5,305,200 | A | 4/1994 | Hartheimer et al. |
| 5,325,297 | A | 6/1994 | Bird et al. |
| 5,329,589 | A | 7/1994 | Fraser et al. |
| 5,375,055 | A | 12/1994 | Togher et al. |
| 5,394,324 | A | 2/1995 | Clearwater |
| 5,426,281 | A | 6/1995 | Abecassis |
| 5,553,145 | A | 9/1996 | Micali |
| 5,640,569 | A | 6/1997 | Miller et al. |
| 5,664,115 | A | 9/1997 | Fraser |
| 5,689,652 | A | 11/1997 | Lupien et al. |
| 5,710,889 | A | 1/1998 | Clark et al. |
| 5,715,402 | A | 2/1998 | Popolo |
| 5,717,989 | A | 2/1998 | Tozzoli et al. |
| 5,727,165 | A | 3/1998 | Ordish et al. |
| 5,790,790 | A | 8/1998 | Smith et al. |
| 5,794,207 | A | 8/1998 | Walker et al. |
| 5,794,219 | A | 8/1998 | Brown |
| 5,818,914 | A | 10/1998 | Fujisaki |
| 5,825,896 | A | 10/1998 | Leedom |
| 5,826,244 | A | 10/1998 | Huberman |
| 5,835,896 | A | 11/1998 | Fisher et al. |
| 5,845,265 | A | 12/1998 | Woolston |
| 5,845,266 | A | 12/1998 | Lupien et al. |
| 5,850,442 | A | 12/1998 | Muftic |
| 5,878,139 | A | 3/1999 | Rosen |
| 5,895,450 | A | 4/1999 | Sloo |
| 6,047,264 | A | 4/2000 | Fisher et al. |
| 6,061,448 | A | 5/2000 | Smith et al. |
| 6,085,176 | A | 7/2000 | Woolston |
| 6,119,137 | A | 9/2000 | Smith et al. |
| 6,178,408 | B1 | 1/2001 | Copple et al. |
| 6,192,407 | B1 | 2/2001 | Smith et al. |
| 6,202,051 | B1 | 3/2001 | Woolston |
| 6,243,691 | B1 | 6/2001 | Fisher et al. |
| 6,330,551 | B1 | 12/2001 | Burchetta et al. |
| 6,336,095 | B1 | 1/2002 | Rosen |
| 6,415,264 | B1 | 7/2002 | Walker et al. |
| 6,415,270 | B1 | 7/2002 | Rackson et al. |
| 6,535,856 | B1 | 3/2003 | Tal |
| 6,553,347 | B1 | 4/2003 | Tavor et al. |
| 6,556,974 | B1 | 4/2003 | D'Alessandro |
| 6,587,838 | B1 | 7/2003 | Esposito et al. |
| 6,598,026 | B1 | 7/2003 | Ojha et al. |
| 6,766,307 | B1 | 7/2004 | Israel et al. |
| 6,850,918 | B1 | 2/2005 | Burchetta et al. |
| 6,856,984 | B2 | 2/2005 | Slaikeu |
| 6,954,741 | B1 | 10/2005 | Burchetta et al. |
| 7,020,634 | B2 | 3/2006 | Khaishgi et al. |
| 7,401,025 | B1 | 7/2008 | Lokitz |
| 7,630,904 | B2 | 12/2009 | Vaidyanathan et al. |
| 7,774,276 | B1 | 8/2010 | Leonardo et al. |
| 7,870,066 | B2 | 1/2011 | Lin et al. |
| 7,877,278 | B1 | 1/2011 | Leonardo et al. |
| 8,209,228 | B2 | 6/2012 | Leonardo et al. |
| 2001/0034635 | A1 | 10/2001 | Winters et al. |
| 2001/0041993 | A1 | 11/2001 | Campbell |
| 2001/0047332 | A1 | 11/2001 | Gonen-Friedman et al. |
| 2001/0053967 | A1 | 12/2001 | Gordon et al. |
| 2002/0007283 | A1 | 1/2002 | Anelli |
| 2002/0007362 | A1 | 1/2002 | Collins et al. |
| 2002/0010591 | A1 | 1/2002 | Pomerance |
| 2002/0010634 | A1 | 1/2002 | Roman et al. |
| 2002/0035480 | A1 | 3/2002 | Gordon et al. |
| 2002/0035528 | A1 | 3/2002 | Simpson et al. |
| 2002/0059130 | A1 | 5/2002 | Cheng et al. |
| 2002/0069182 | A1 | 6/2002 | Dwyer |
| 2002/0143711 | A1 | 10/2002 | Nassiri |
| 2002/0147604 | A1 | 10/2002 | Slate, II et al. |
| 2002/0161597 | A1 | 10/2002 | Klibaner |
| 2002/0198830 | A1 | 12/2002 | Randell et al. |
| 2003/0212891 | A1 | 11/2003 | Evans et al. |
| 2004/0044586 | A1 | 3/2004 | Gullo |
| 2004/0059596 | A1 | 3/2004 | Vaidyanathan et al. |
| 2004/0128155 | A1 | 7/2004 | Vaidyanathan et al. |
| 2004/0148234 | A1 | 7/2004 | Gonen-Friedman et al. |
| 2004/0267559 | A1 | 12/2004 | Hinderer et al. |
| 2005/0125340 | A1 | 6/2005 | Lin et al. |
| 2005/0171917 | A1 | 8/2005 | Femenia et al. |
| 2005/0246268 | A1 | 11/2005 | Foran et al. |
| 2005/0289039 | A1 | 12/2005 | Greak |
| 2006/0031177 | A1 | 2/2006 | Rule |
| 2008/0059329 | A1 | 3/2008 | Luchene et al. |
| 2008/0307066 | A1 | 12/2008 | Amidon et al. |
| 2010/0100483 | A1 | 4/2010 | Lin et al. |
| 2010/0268624 | A1 | 10/2010 | Leonardo et al. |
| 2011/0106661 | A1 | 5/2011 | Leonardo et al. |

FOREIGN PATENT DOCUMENTS

| | | |
|---|---|---|
| NL | 9300266 A | 2/1993 |
| WO | WO-9215174 A1 | 9/1992 |
| WO | WO-9634356 A1 | 10/1996 |
| WO | WO-9737315 A1 | 10/1997 |
| WO | WO-2004111774 A2 | 12/2004 |
| WO | WO-2004111774 A3 | 12/2004 |
| WO | WO-2006017496 A2 | 2/2006 |
| WO | WO-2006017496 A3 | 2/2006 |

OTHER PUBLICATIONS

"U.S. Appl. No. 09/583,216, Advisory Action mailed Jan. 8, 2009", 3 pgs.

"U.S. Appl. No. 09/583,216, Advisory Action mailed Jan. 14, 2004", 2 pgs.

"U.S. Appl. No. 09/583,216, Advisory Action mailed Jul. 7, 2005", 4 pgs.

"U.S. Appl. No. 09/583,216, Appeal Brief filed Jul. 11, 2005", 20 pgs.

"U.S. Appl. No. 09/583,216, Final Office Action mailed Mar. 11, 2005", 7 pgs.

"U.S. Appl. No. 09/583,216, Final Office Action mailed Oct. 3, 2008", 14 pgs.

"U.S. Appl. No. 09/583,216, Final Office Action mailed Oct. 10, 2003", 14 pgs.

"U.S. Appl. No. 09/583,216, Non Final Office Action mailed Mar. 16, 2010", 15 pgs.

"U.S. Appl. No. 09/583,216, Non Final Office Action mailed May 6, 2004", 14 pgs.

"U.S. Appl. No. 09/583,216, Non-Final Office Action mailed Feb. 15, 2008", 12 pgs.

"U.S. Appl. No. 09/583,216, Non-Final Office Action mailed Apr. 17, 2009", 13 pgs.

"U.S. Appl. No. 09/583,216, Notice of Allowance mailed Aug. 18, 2010", 4 pgs.

"U.S. Appl. No. 09/583,216, Preliminary Amendment filed Oct. 31, 2007", 13 pgs.

"U.S. Appl. No. 09/583,216, PTO Response to 312 Amendment mailed Dec. 23, 2010", 2 pgs.

"U.S. Appl. No. 09/583,216, Response filed Apr. 15, 2005 to Advisory Action", 8 pgs.

"U.S. Appl. No. 09/583,216, Response filed May 11, 2005 to Final Office Action mailed Mar. 11, 2005", 6 pgs.

"U.S. Appl. No. 09/583,216, Response filed Jun. 11, 2010 to Non Final Office Action mailed Mar. 16, 2010", 9 pgs.

"U.S. Appl. No. 09/583,216, Response filed Jun. 16, 2008 to Non Final Office Action mailed Feb. 15, 2008", 11 pgs.

"U.S. Appl. No. 09/583,216, Response filed Jul. 14, 2003 to Non Final Office Action mailed Apr. 14, 2003", 10 pgs.

"U.S. Appl. No. 09/583,216, Response filed Sep. 17, 2009 to Non Final Office Action mailed Apr. 17, 2009", 9 pgs.

"U.S. Appl. No. 09/583,216, Response filed Nov. 8, 2004 to Non Final Office Action mailed May 6, 2004", 2 pgs.

"U.S. Appl. No. 09/583,216, Response filed Dec. 3, 2008 to Final Office Action mailed Oct. 3, 2008", 17 pgs.

"U.S. Appl. No. 09/711,578, Pre Appeal Brief Request for Review filed Sep. 27, 2012", 5 pgs.
"U.S. Appl. No. 09/711,578, Advisory Action mailed Sep. 13, 2012", 2 pgs.
"U.S. Appl. No. 09/711,578, Appeal Brief filed Aug. 3, 2006", 18 pgs.
"U.S. Appl. No. 09/711,578, Appeal Brief filed Oct. 27, 2004", 19 pgs.
"U.S. Appl. No. 09/711,578, Decision on Appeal Brief mailed Dec. 11, 2008", 11 pgs.
"U.S. Appl. No. 09/711,578, Final Office Action mailed Jan. 10, 2006", 8 pgs.
"U.S. Appl. No. 09/711,578, Final Office Action mailed Apr. 23, 2004", 7 pgs.
"U.S. Appl. No. 09/711,578, Final Office Action mailed Jun. 27, 2012", 8 pgs.
"U.S. Appl. No. 09/711,578, Non Final Office Action mailed Jan. 7, 2005", 7 pgs.
"U.S. Appl. No. 09/711,578, Non Final Office Action mailed Jul. 15, 2005", 8 pgs.
"U.S. Appl. No. 09/711,578, Non Final Office Action mailed Sep. 8, 2003", 7 pgs.
"U.S. Appl. No. 09/711,578, Response filed Feb. 9, 2004 to Non Final Office Action mailed Sep. 8, 2003", 6 pgs.
"U.S. Appl. No. 09/711,578, Response filed May 9, 2005 to Non Final Office Action mailed Jan. 7, 2005", 7 pgs.
"U.S. Appl. No. 09/711,578, Response filed Aug. 22, 2012 to Non Final Office Action mailed Jun. 27, 2012", 10 pgs.
"U.S. Appl. No. 09/711,578, Response filed Sep. 23, 2004 to Final Office Action mailed Apr. 23, 2004", 5 pgs.
"U.S. Appl. No. 09/711,578, Response filed Oct. 17, 2005 to Non Final Office Action mailed Jul. 17, 2005", 8 pgs.
"U.S. Appl. No. 09/717,433, Advisory Action mailed Oct. 16, 2007", 3 pgs.
"U.S. Appl. No. 09/717,433, Final Office Action mailed May 8, 2007", 7 pgs.
"U.S. Appl. No. 09/717,433, Final Office Action mailed Sep. 8, 2008", 8 pgs.
"U.S. Appl. No. 09/717,433, Final Office Action mailed Sep. 18, 2009", 13 pgs.
"U.S. Appl. No. 09/717,433, Final Office Action mailed Nov. 18, 2003", 4 pgs.
"U.S. Appl. No. 09/717,433, Non Final Office Action mailed May 2, 2006", 8 pgs.
"U.S. Appl. No. 09/717,433, Non Final Office Action mailed May 4, 2005", 4 pgs.
"U.S. Appl. No. 09/717,433, Non Final Office Action mailed Jun. 3, 2003", 13 pgs.
"U.S. Appl. No. 09/717,433, Non Final Office Action mailed Oct. 18, 2006", 8 pgs.
"U.S. Appl. No. 09/717,433, Non Final Office Action mailed Nov. 8, 2004", 4 pgs.
"U.S. Appl. No. 09/717,433, Non-Final Office Action mailed Feb. 5, 2009", 13 pgs.
"U.S. Appl. No. 09/717,433, Non-Final Office Action mailed Feb. 6, 2008", 9 pgs.
"U.S. Appl. No. 09/717,433, Notice of Allowance mailed Apr. 1, 2010", 14 pgs.
"U.S. Appl. No. 09/717,433, Pre-Appeal Brief Request for Review filed Aug. 8, 2007", 5 pgs.
"U.S. Appl. No. 09/717,433, Response filed Jan. 18, 2007 to Non Final Office Action mailed Oct. 18, 2006", 7 pgs.
"U.S. Appl. No. 09/717,433, Response filed Feb. 8, 2005 to Non Final Office Action mailed Nov. 8, 2004", 10 pgs.
"U.S. Appl. No. 09/717,433, Response filed Jun. 3, 2009 to Non Final Office Action mailed Feb. 5, 2009", 17 pgs.
"U.S. Appl. No. 09/717,433, Response filed Jun. 5, 2008 to Non-Final Office Action mailed Feb. 6, 2008", 13 pgs.
"U.S. Appl. No. 09/717,433, Response filed Jul. 9, 2007 to Final Office Action mailed May 8, 2007", 7 pgs.
"U.S. Appl. No. 09/717,433, Response filed Aug. 1, 2005 to Non Final Office Action mailed May 4, 2005", 4 pgs.
"U.S. Appl. No. 09/717,433, Response filed Aug. 2, 2006 to Non Final Office Action mailed May 2, 2006", 11 pgs.
"U.S. Appl. No. 09/717,433, Response filed Sep. 2, 2003 to Non Final Office Action mailed Jun. 3, 2003", 11 pgs.
"U.S. Appl. No. 09/717,433, Response filed Nov. 5, 2007 to Final Office Action mailed May 8, 2007", 14 pgs.
"U.S. Appl. No. 09/717,433, Response filed Nov. 10, 2008 to Final Office Action mailed Sep. 8, 2008", 17 pgs.
"U.S. Appl. No. 09/717,433, Response filed Dec. 18, 2009 to Final Office Action mailed Sep. 18, 2009", 13 pgs.
"U.S. Appl. No. 10/837,224, Advisory Action mailed May 28, 2009", 3 pgs.
"U.S. Appl. No. 10/837,224, Final Office Action mailed Feb. 4, 2009", 12 pgs.
"U.S. Appl. No. 10/837,224, Non-Final Office Action mailed Jan. 10, 2008", 7 pgs.
"U.S. Appl. No. 10/837,224, Notice of Allowance mailed Sep. 4, 2009", 12 pgs.
"U.S. Appl. No. 10/837,224, Notice of Allowance mailed Sep. 8, 2010", 5 pgs.
"U.S. Appl. No. 10/837,224, Response filed May 12, 2008 to Non-Final Office Action mailed Jan. 10, 2008", 18 pgs.
"U.S. Appl. No. 10/837,224, Response filed Jun. 4, 2009 to Advisory Action mailed May 28, 2009", 13 pgs.
"U.S. Appl. No. 10/837,224, Response filed Apr. 6, 2009 to Final Office Action mailed Feb. 4, 2009", 13 pgs.
"U.S. Appl. No. 11/004,699, Appeal Brief filed Jan. 17, 2007", 23 pgs.
"U.S. Appl. No. 11/004,699, Decision on Appeals mailed May 3, 2012", 7 pgs.
"U.S. Appl. No. 11/004,699, Decision on Pre-Appeal Brief Request mailed Nov. 17, 2006", 2 pgs.
"U.S. Appl. No. 11/004,699, Final Office Action mailed Jul. 14, 2006", 7 pgs.
"U.S. Appl. No. 11/004,699, Non Final Office Action mailed Jan. 20, 2006", 6 pgs.
"U.S. Appl. No. 11/004,699, Non Final Office Action mailed Aug. 5, 2005", 6 pgs.
"U.S. Appl. No. 11/004,699, Notice of Allowance mailed Jul. 18, 2012", 8 pgs.
"U.S. Appl. No. 11/004,699, Notice of Allowance mailed Sep. 19, 2012", 8 pgs.
"U.S. Appl. No. 11/004,699, Pre-Appeal Brief Request for Review filed Sep. 14, 2006", 4 pgs.
"U.S. Appl. No. 11/004,699, Preliminary Amendment filed Dec. 3, 2004", 14 pgs.
"U.S. Appl. No. 11/004,699, Reply Brief filed Nov. 21, 2007", 5 pgs.
"U.S. Appl. No. 11/004,699, Response filed Apr. 20, 2006 to Non Final Office Action mailed Jan. 20, 2006", 15 pgs.
"U.S. Appl. No. 11/004,699, Response filed Jun. 28, 2012 to Decision on Appeal mailed Mar. 3, 2012", 19 pgs.
"U.S. Appl. No. 11/004,699, Response filed Nov. 7, 2005 to Non Final Office Action mailed Aug. 5, 2005", 14 pgs.
"U.S. Appl. No. 11/195,578, Advisory Action mailed Apr. 8, 2010", 4 pgs.
"U.S. Appl. No. 11/195,578, Appeal Brief filed Jun. 18, 2010", 28 pgs.
"U.S. Appl. No. 11/195,578, Final Office Action mailed Jan. 20, 2010", 30 pgs.
"U.S. Appl. No. 11/195,578, Final Office Action mailed Feb. 16, 2011", 36 pgs.
"U.S. Appl. No. 11/195,578, Non-Final Office Action mailed May 28, 2009", 23 pgs.
"U.S. Appl. No. 11/195,578, Non-Final Office Action mailed Sep. 2, 2010", 29 pgs.
"U.S. Appl. No. 11/195,578, Response filed Mar. 22, 2010 to Final Office Action mailed Jan. 20, 2010", 16 pgs.
"U.S. Appl. No. 11/195,578, Response filed May 16, 2011 to Final Office Action mailed Feb. 16, 2011", 13 pgs.
"U.S. Appl. No. 11/195,578, Response filed Sep. 28, 2009 to Non Final Office Action mailed May 28, 2009", 21 pgs.
"U.S. Appl. No. 11/195,578, Response filed Dec. 2, 2010 to Non Final Office Action mailed Sep. 2, 2010", 13 pgs.
"U.S. Appl. No. 12/638,938, Non Final Office Action mailed Oct. 10, 2012", 7 pgs.

"U.S. Appl. No. 12/826,504, Non Final Office Action mailed Feb. 6, 2012", 9 pgs.

"U.S. Appl. No. 12/826,504, Non Final Office Action mailed Jun. 28, 2011", 9 pgs.

"U.S. Appl. No. 12/826,504, Response filed Jun. 6, 2012 to Non Final Office Action mailed Feb. 6, 2012", 7 pgs.

"U.S. Appl. No. 12/826,504, Response filed Aug. 26, 2011 to Non Final Office Action mailed Jun. 28, 2011", 9 pgs.

"U.S. Appl. No. 12/987,822, Non Final Office Action mailed Jul. 25, 2011", 5 pgs.

"U.S. Appl. No. 12/987,822, Notice of Allowance mailed Mar. 1, 2012", 7 pgs.

"U.S. Appl. No. 12/987,822, Response filed Oct. 25, 2011 to Non Final Office Action mailed Jul. 25, 2011", 9 pgs.

"Crash Shuts Down Ebay for Much of the Day", [Online]. Retrieved from the internet:<http://www.nytimes.com/1999/06/12/business/crash-shuts-down-ebay-for-much-of-the-day.html>, (Jun. 12, 1999), 2 pgs.

"eBay—Your personal Trading Company", [Online]. Retrieved from the Internet: <URL: http://web.archive.org/web/19991110180343/http://www.ebay.com/index.html>, (Archived Nov. 1999), 4 pgs.

"eBay Website", [Online]. Retrieved from the Internet: <URL: http://web.archive.org/web/19991014023408/http://www.ebay.com/index.html>, (Archived Oct. 14, 1999), 31 pgs.

"European Application Serial No. 05777559.5, Extended European Search Report mailed Mar. 23, 2009", 6 pgs.

"European Application Serial No. 05777559.5, Office Action mailed Jul. 15, 2009", 1 pg.

"Holiday e-Shoppers to Get Double Assurance as Two Consumer Groups Partner to Promote Safer Shopping On-line", PR Newswire, (Nov. 16, 2000), 2 pgs.

"International Application Serial No. PCT/US04/17641, International Search Report and Written Opinion mailed Mar. 28, 2005", 10 pgs.

"International Application Serial No. PCT/US2004/017641, International Preliminary Examination Report mailed Feb. 2, 2007", 9 pgs.

"International Application Serial No. PCT/US2004/017641, Written Opinion mailed Mar. 28, 2005", 4 pgs.

"International Application Serial No. PCT/US2005/027407, International Preliminary Report on Patentability mailed Feb. 15, 2007", 6 pgs.

"International Application Serial No. PCT/US2005/027407, International Search Report and Written Opinion mailed Apr. 14, 2006", 12 pgs.

"Online Resolution Settles E-Commerce, Business and Insurance Disputes Online Without Going to Court", PR Newswire, (Nov. 8, 2000), 1 pg.

"Onsale Joins Fray as Online Shopping Picks Up Speed: Internet Booms", Computer Reseller News, CMP Publications, Inc., USA, (Jun. 5, 1995), 1 pg.

"Onsale: Onsale Brings Thrill of Auctions and Bargain Hunting Online; Unique Internet retail service debuts with week-long charity auction for the Computer Museum in Boston", Business Wire, Dialog Web. 0489267 BW0022, (May 24, 1995), 3 pgs.

"SquareTrade's online dispute resolution process: step by step", [Online]. Retrieved from the Internet: <URL: http://web.archive.org/web/20000510210634/http://www.squaretrade.com/learnmore/learnmore_processon.cfm>, (Archived May 10, 2000), 1 pg.

"The Feedback Forum", eBay, [Online]. Retrieved from the Internet: <URL: http://web.archive.org/web/19990117033159/pages.ebay.com/aw/index.html>, (Archived Jan. 16, 1999), 7 pgs.

"The Feedback Forum: FAQ", eBay, [Online]. Retrieved from the Internet: <URL: http://web.archive.org/web/19991012230420/pages.ebay.com/help/basics/f-feedback.html>, (Archived Oct. 12, 1999), 4 pgs.

"UAUTOBID.com, Inc. Introduces the Capability to Purchase Specific Vehicles Online", Business Wire, (Sep. 13, 1999), 1 pg.

Arsenault, Lisa, "Web Wise", Canadian Insurance, 103(9), (Aug. 1998), 6 Pages.

Baumann, G. W, "Personal Optimized Decision/Transaction Program", IBM Technical Disclosure Bulletin,, (Jan. 1995), 83-84.

Clemons, E., "Evaluating the prospects for alternative electronic securities", Proceedings of ICIS 91: 12th International Conference on Information Systems, (Dec. 16-18, 1991), 53-61.

Girard, Kim, "Ebay Waives Fees after Major Outage", [Online]. Retrieved from the Internet:<http://news.cnet.com/21 00-1017-227050.html>, (Jun. 14, 1999), 6 pgs.

Graham, Ian, "The Emergence of Linked Fish Markets in Europe", Electronic Markets. vol. 8, No. 2, (1998), 1-4.

Hauser, R., "Anonymous Delivery of Goods in Electronic Commerce", IBM Technical Disclosure Bulletin, 39(3), (Mar. 1996), 363-366.

Hess, C. M, et al., "Computerized Loan Organization System: An Industry Case Study of the Electronic Markets Hypothesis", MIS Quarterly, vol. 18(3), (Sep. 1994), 251-274.

Kandra, Anne, "Consumer Watch: Resolutions for Smart Buyers", PC World magazine, 19(1), (Jan. 2001), 27-30.

Klein, Stefan, "Introduction to Electronic Auctions", EM—Electronic Auctions. EM—Electronic Markets, vol. 7, No. 4, (Dec. 1997), 3-6.

Lee, H. G, "Electronic brokerage and electronic auction: the impact of IT on market structures", Proceedings of the Twenty-Ninth Hawaii International Conference on System Sciences, vol. 4, (1996), 397-406.

Lee, Ho Geun, "AUCNET: Electronic Intermediary for Used-Car Transactions", Focus Theme, Electronic Markets, vol. 7, No. 4, (1997), 24-28.

Malone, T., et al., "Electronic Markets and Electronic Hierarchies", Communications of the ACM, 14(25), (Jun. 1987), 484-497.

Mardesich, Jodi, "Site Offers Clearance for End-of-Life Products—Onsale Takes Auction Gavel Electronic", Computer Reseller News, (Jul. 8, 1996), 2 pps.

Massimb, Marcel, "Electronic Trading, Market Structure and Liquidity", Financial Analysts Journal, 50(1), (Jan./Feb. 1994), 39-50.

Neo, B. S, "The implementation of an electronic market for pig trading in Singapore", Journal of Strategic Information Systems; vol. 1(5), (Dec. 1992), 278-288.

Post, D. L, et al., "Application of auctions as a pricing mechanism for the interchange of electric power", IEEE Transactions on Power Systems, 10(3), (Aug. 1995), 1580-1584.

Reck, M., "Formally Specifying an Automated Trade Execution System", The Journal of Systems and Software, 1993, Elsevier Science Publishing, USA, (1993), 245-252.

Reck, Martin, "Trading-Process Characteristics of Electronic Auctions", Focus Theme, vol. 7, No. 4, (1997), 17-23.

Rockoff, T. E, et al., "Design of an Internet-based system for remote Dutch auctions", Internet Research: Electronic Networking Applications and Policy, vol. 5(4), (Jan. 1, 1995), 10-16.

Rule, Colin, "Online Dispute Resolution for Business—B2B, E-Commerce, Consumer, Employment, Insurance, and Other Commercial Conflicts", A Wiley Imprint, (2002), 1-326.

Schmid, B. F, "The Development of Electronic Commerce", EM—Electronic Markets, No. 9-10, (Oct. 1993), 2 pgs.

Siegmann, Ken, "Nowhere to go but up", PC Week; vol. 12(42), Ziff-Davis Publishing Company, (Oct. 23, 1995), 1-3.

Tjostheim, Ingvar, et al., "A case study of an on-line auction for the World Wide Web", Norwegian Computing Center (NR), [Online]. Retrieved from the Internet: <URL: http://www.nr.no/~ingvar/enter98.html>, (Accessed Feb. 21, 2005), 1-10.

Turban, Efraim, "Auctions and Bidding on the Internet: An Assessment", Focus Theme, EM—Electronic Markets, vol. 7, No. 4, (1997), 7-11.

Van Heck, E., et al., "Experiences with Electronic Auctions in the Dutch Flower Industry", Focus Theme, Erasmus University, The Netherlands, (1996), 6 pgs.

Warbelow, A, et al., "Aucnet: TV Auction Network System", Harvard Business School Case/Study, HBVR#9-190-001, USA, (Jul. 1989), 1-15.

Zwass, V., "Electronic Commerce: Structures and Issues", International Journal of Electronic Commerce, Fall 1996, vol. 1, No. 1, (Fall 1996), 3-23.

FRAUD/INSURANCE CLAIM TABLE

| ITEM NO# | COMPLAINTANT | COMPLAINTEE | CONTACT INFO OF COMPLAINTEE | DATE COMPLAINT FILED | TRACKING NO# OF COMPLAINT | FEEDBACK RATINGS AND NATURE OF COMPLAINT |
|---|---|---|---|---|---|---|
| 312 | 314 | 316 | 318 | 320 | 322 | 324 |

COMPLAINT TYPE TABLE — 400

| PROBLEM CODE | PROBLEM DESCRIPTION | PROBLEM TYPE |
|---|---|---|
| | | |
| | | |

CONTACT INFO TABLE OF ATTORNEY GENERALS — 500

| ATTORNEY GENERAL | STATE | CONTACT INFO |
|---|---|---|
| | | |
| | | |

COMMENTS TABLE

| TRACKING NO# | USER | DATE OF COMMENT | TEXT OF COMMENT | REGISTERED CUSTOMER |
|---|---|---|---|---|
| 620 | 622 | 624 | 626 | 628 |

ADDRESS AND PASSWORDS TABLE

| EMAIL ADDRESS | PASSWORD |
|---|---|
| 720 | 722 |

INSURANCE ITEM TABLE

| ITEM NO# | CLAIM NO# | DATA |
|---|---|---|
| ~820 | ~822 | ~824 |

INSURANCE CLAIMS TABLE

| CLAIM NO# | AMOUNT CLAIMED | DATE OF CLAIM |
|---|---|---|
| ~920 | ~922 | ~924 |

900

The following is a list of examples of when it may be appropriate to use the Fraud Reporting and Insurance Claim Form.

You sent the seller payment and:

- You did not receive any or all of the items
- You received the item, but the item is significantly different than the item description.
- You received the item, but the item is counterfeit.

If the Fraud Reporting and Insurance Claim form is not appropriate for your situation, consider using the following links:

Community Watch Form - to report illegal and infringing items
Final Value Fee Credit Form - to request credit due to a non-paying bidder
Safe Harbor - to report possible misuse on eBay (for example, bidding or feedback offenses)

Please select the scenario below that most closely describes the problem surrounding this transaction. After making your selection, press the "Continue" button at the bottom of the page.

⌐ 1200

◉ I sent a payment but never received any merchandise.

○ I sent a payment and received the merchandise, but the merchandise is different than the seller described it.

○ I sent a payment and received the merchandise, but the merchandise arrived in damaged condition.

○ I sent a payment and received merchandise, but the merchandise is fake.

○ I sent a payment and received some of the items that I purchased, but not all of the items.

○ Other

| Continue |

FIG. 12

CLAIM FORM

← 1300

Claim Number: 66876742

Name: _____
Email Address: _____
Home Address: _____
City/State/Zip: _____
Home Phone (Include Area Code & Country Code if necessary): ( ) _____
Work Phone (Include Area Code & Country Code if necessary): ( ) _____
Best Time/Place to Reach You: _____
Social Security #: _____
Driver's License #: _____
Auction Number and Trade Date: _____
Total $ Amount of Trade: _____
Steps taken to resolve the problem: _____
(please use back of form or _____
additional sheets if necessary) _____

Complete Description of Problem: _____
(please use back of form or _____
additional sheets if necessary) _____

***Please include copies of any cancelled checks, credit card receipts, appraisals, additional photographs, or any other information you have regarding this claim.

Send Completed Claim form to:
Lloyd's Claims Administrator, 6745 Phillips Ind. Blvd., Jacksonville, FL 32256

I hereby attest that all of the information contained in this document is true and accurate.

_____    _____
Claimant Signature    Date        Initials    Date

Initial here if you would like your claim amount credited to your eBay account.

ANY PERSON WHO KNOWINGLY AND WITH INTENT TO INJURE, DEFRAUD OR DECEIVE ANY INSURER, FILES A STATEMENT OF CLAIM OR AN APPLICATION CONTAINING FALSE, INCOMPLETE, OR MISLEADING INFORMATION IS GUILTY OF A FELONY IN THE THIRD DEGREE AND WILL BE PUNISHED TO THE FULLEST EXTENT OF THE LAW.

FIG. 13

Thank you for using the Fraud Reporting and Insurance Claim Form. Attempts will now be made to contact the other user via email. You are also advised to contact the other user by whatever means available. Specifically, if you have not yet tried contacting the other user by phone, please do so. We are happy to provide you with all the necessary information to contact the other user.

Your complaint has been given the tracking number below. You will need this number when you use the Fraud Reporting and Insurance Claim Form in subsequent visits.

2629 ~1402

You will be notified within 30 days regarding the status of your complaint. Whenever you would like to check the status of your complaint or let us know that the problem has been resolved, please go to the Fraud Reporting and Insurance Claim Form at:

http://tdalton.corp.ebay.com/aw_cgi/eBayISAPI.dll?CRSStartPage

If you have not resolved your complaint within 30 days from today, you can file an insurance claim by mailing:

1) a hard copy of the auction item page AND
    2) a completed Claim Form (Claim Form is available at
    http://pages.ebay.com/services/safeharbor/frs-claimform.html)

to:
    CynoSure Financial, Inc.
    6745 Phillips Industrial Blvd.,
    Jacksonville, FL 32256

Again, thank you for using the Fraud Reporting and Insurance Claim form to attempt to resolve your problem.

FIG. 14

Here is a list of complaints the user has filed with eBay. Please select the complaint you are inquiring about at this time:

| 2629 |
|------|

| 10631 | CLOSED |
| 12898 | CLOSED |
| 15828 | CLOSED |
| 16148 | CLOSED |
| 18959 | CLOSED |
| 20860 | CLOSED |
| 21640 | CLOSED |
| 21863 | CLOSED |
| 22206 | CLOSED |
| 23260 | CLOSED |
| 25607 | CLOSED |
| 25871 | RESOLVED |

FIG. 16

Here is general information about the complaint:

Tracking Number: 2629
Complainant: TDALTON@EBAY.COM (tola@cats.ucsc.edu)
Against: Tola A. Dalton
TDALTON@EBAY.COM
Web Site: ebay.com
Date Complaint Filed: 03/24/00 14:36:07 PST
Nature of Complaint: I sent a payment but never received any merchandise.

The following are ALL of the comments provided to the Fraud Reporting System regarding this complaint:

---

03/24/2000 02:43 PM - FROM: tolaslug
------------------------------------------------
testing

---

To place another comment or respond to a comment from the other user, please enter information in the space below and press "Continue".

We're sorry that you were unable to resolve this complaint to your satisfaction. However, we appreciate your attempt to do so at the Fraud Reporting and Insurance Claim Form. Your use of the system allows us to track the actions of "bad players" at eBay, and hopefully, remove these users from the system.

Here are some steps that you can take to engage the assistance of state and federal agencies regarding your problem. Often, even the threat of intervention by these agencies will entice the other user to resolve the dispute to your satisfaction.

1. Write a letter to the Attorney General of the state where the other user resides. Based on the information you have given us, here is the address for the Attorney General:

Office of the Attorney General
    Public Inquiry Unit
    P.O. Box 944255

Sacramento, CA 94244-2550

Phone: (800) 952-5225

2. Fill out the online complaint form at the Web site of the Attorney General of the state where the other user resides. Based on the information you have given us, the Web address for that form is:

http://caag.state.ca.us/piu/mailform.htm

3. File a mail fraud complaint with the U.S. Postal Inspection Service - Postal Inspectors are federal law enforcement agents responsible for investigating mail fraud claims. Generally, in order for a claim to constitute mail fraud, either payment or delivery of the merchandise must have occurred through the U.S. mail. If your complaint fits within this requirement, it is very important that you take the time to file a complaint with this office, since it is this agency that most likely will have jurisdiction over the matter. To receive a mail fraud complaint form, e-mail your request to fraud@uspis.gov and the form will be e-mailed to you. Print and mail the completed form and any necessary attachments to the attention of one of the Inspection Service offices listed. You can also request a form by contacting your nearest Postal Inspection Office. To find the office nearest to you, either call your local Post Office or visit the following website:
http://www.usps.gov/ncsc/locators/find-is.html 4. You are eligible to file an insurance claim. Please press the button below and then save and print out this form. After you have filled it out, mail it to the address on the form to file your insurance claim. PLEASE BE SURE TO PRINT AND SAVE THIS FORM!

[ View Printable Insurance Form ]

Be sure to keep a copy of all correspondence between you and these agencies, and you and the other user. If, in the future, you resolve this complaint with the other user, please return to eBay's Fraud Reporting System and report this case as resolved.

Here is the contact information that eBay has on file for the other party.

Tola A. Dalton
Santa Cruz, CA 95060

Primary phone: (831) 466-1890     STATUS PENDING                    2500
Secondary phone:
Fax: (831) 466-1899
EMail: tdalton@ebay.com

Here is general information about the complaint:

Tracking Number:    3691
    Complainant:    tolaslug (tdalton@ebay.com)
    Against:    Tola A. Dalton
        TOLA@CATS.UCSC.EDU
    Web Site:    ebay.com
    Date Complaint Filed:    12/07/99 17:16:11 PST
    Nature of Complaint:    I received a check from the buyer and sent the merchandise, however, the buyer's check was returned for insufficient funds (bounced)

The following are ALL of the comments provided to the Fraud Reporting System regarding this complaint:

---

12/07/1999 05:16 PM - FROM: tola testing

---

12/15/1999 02:06 PM - FROM: tola hmm, what will this do?

---

12/15/1999 02:09 PM - FROM: tolaslug

I think the programmers of CRS must have been monkeys

---

12/15/1999 02:18 PM - FROM: tolaslug aarrrgh!

---

12/15/1999 03:05 PM - FROM: tolaslug aarrrgh!

---

12/15/1999 04:35 PM - FROM: tola tola99 (tdalton@ebay.com) posting comment

---

12/16/1999 07:52 PM - FROM: tola tola99 (tdalton@ebay.com) posting comment

---

To place another comment or respond to a comment from the other user, please enter information in the space below and press "Continue".

METHOD AND SYSTEM FOR FILING A COMPLAINT RELATED TO NETWORK-BASED TRANSACTIONS

RELATED APPLICATIONS

This application is a continuation of U.S. application Ser. No. 12/987,822, filed Jan. 10, 2011, which application is a continuation of U.S. application Ser. No. 09/583,216, filed on May 30, 2000, which application are incorporated herein by reference in their entirety.

FIELD OF THE INVENTION

The present invention relates generally to the field of e-commerce. More particularly, the present invention relates to a method and system for reporting fraud and claiming compensation related to network-based transactions.

BACKGROUND OF THE INVENTION

A common type of network-based transaction is purchasing goods or services via a network-based transaction facility, e.g., a website on the Internet. A common problem associated with such network-based transactions is fraud. For example, a seller may defraud a buyer and vice versa a buyer may defraud a seller. One type of network-based transaction is an online-auction transaction. In an online-auction transaction, a seller may offer an item for sale via an auction website in which a number of bidders access the website and bid for the item. A transaction is completed after the winning bidder pays for the item and the seller delivers the item to the winning bidder.

However, a seller may defraud a winning bidder, e.g., by accepting payment of an auctioned item and not delivering the item, delivering the item defective, delivering the item that is different than an advertised description of the item, or delivering a counterfeit item. Alternatively, a winning bidder may defraud a seller, e.g., by sending an incorrect amount of payment, sending a form of payment that is defective, or sending a form of payment with insufficient funds.

Thus, there is a need to allow users to report and settle potential fraud cases and, if transactions are fraudulent, allow users to file insurance claims for such transactions in which financial loss has occurred.

SUMMARY OF THE INVENTION

A method and system for reporting fraud and claiming insurance related to network-based transactions are disclosed. For one embodiment, a submission of a complaint is facilitated to a network-based facility in which the complaint relates to a network-based transaction. The complaint is associated with an identifier. A resolution of the complaint associated with the identifier is facilitated, and if the complaint is not resolved, an insurance claim is facilitated for the unresolved complaint.

Other features of the present invention will be apparent form the accompanying drawings and from the detailed description that follows.

BRIEF DESCRIPTION OF THE DRAWINGS

The present invention is illustrated by way of example and not limited by the figures of the accompanying drawings, in which like references indicate similar elements and in which:

FIG. 3 is a diagrammatic representation of an exemplary fraud/insurance claim table of the database illustrated in FIG. 2;

FIG. 4 is a diagrammatic representation of an exemplary complaint type table of the database illustrated in FIG. 2;

FIG. 5 is a diagrammatic representation of an exemplary contact information table of attorney generals of the database illustrated in FIG. 2;

FIG. 6 is a diagrammatic representation of an exemplary comments table of the database illustrated in FIG. 2;

FIG. 7 is a diagrammatic representation of an exemplary address and password table of the database illustrated in FIG. 2;

FIG. 8 is a diagrammatic representation of an exemplary insurance claim table of the database illustrated in FIG. 2;

FIG. 9 is a diagrammatic representation of an exemplary insurance claim details table of the database illustrated in FIG. 2;

FIG. 11 illustrates an exemplary introduction interface for reporting fraud and claiming insurance;

FIG. 12 illustrates an exemplary interface providing options for a user to select relating to common problems surrounding a transaction;

FIG. 13 illustrates an exemplary interface of a claim or complaint form;

FIG. 14 illustrates an exemplary interface providing a user a tracking number and options checking the status of a complaint;

FIG. 16 illustrates an exemplary interface allowing a user to select a claim to inquire the status of the complaint;

FIG. 18 illustrates an exemplary interface providing a user with information regarding a complaint and allowing a user to provide comments regarding the complaint;

FIG. 21 illustrates an exemplary interface providing a user with options for an unresolved complaint and allowing a user to file an insurance claim form;

FIG. 25 illustrates an exemplary interface providing contact information of a user who has filed a complaint;

FIG. 26 illustrates an exemplary interface for providing general information about a complaint and allowing a user to provide comments in response to comments from a complaining user.

DETAILED DESCRIPTION

A method and system for reporting fraud and claiming insurance related to network-based transactions are described. For one embodiment, a submission of a complaint is facilitated to a network-based facility in which the complaint relates to a network-based transaction. The complaint is associated with an identifier. A resolution of the complaint associated with the identifier is facilitated, and if the complaint is not resolved, an insurance claim is facilitated for the unresolved complaint.

The method and system described herein allow users to report and settle potential fraud cases. For example, a network-based facility allows users to detail their complaints related to network-based transactions and to provide a process allowing users to resolve their complaints. Furthermore, if transactions are fraudulent, the method and system described herein allow users to file an insurance claim in which a financial loss has occurred. For example, if a complaint cannot be resolved, users are allowed to claim insurance for unresolved transactions under certain criteria.

In the following embodiments, for purposes of explanation, numerous specific details are set forth in order to provide a thorough understanding of the present invention. It will be evident, however, to one skilled in the art that the present invention may be practiced without these specific details.

Terminology

In the following embodiments, the term "transaction" or "transactions" shall be taken to include any communications between two or more entities and shall be construed to include, but not limited to, commercial transactions including sale and purchase transactions, online-auction transactions and the like.

Transaction Facility

Figure 1:
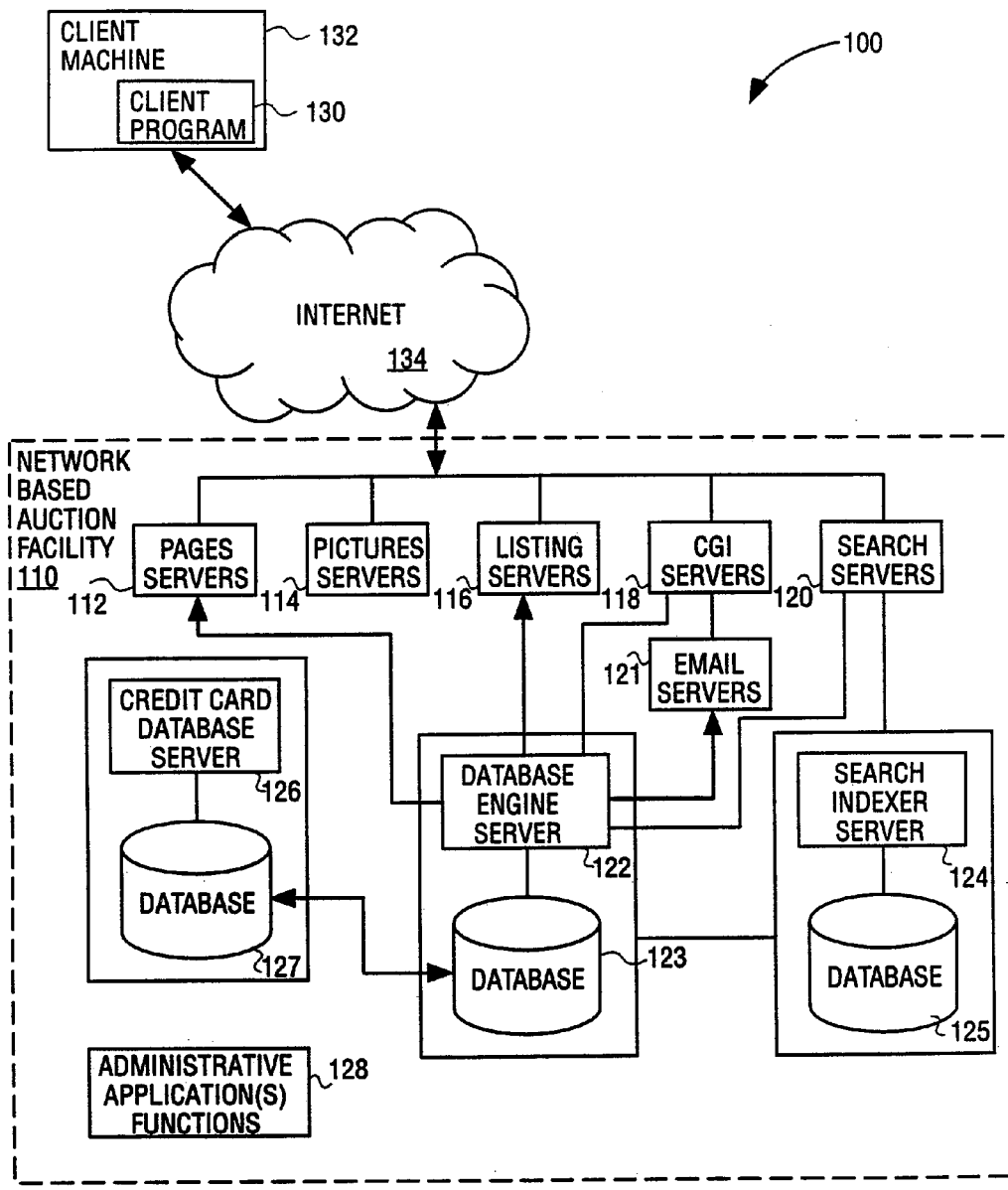
FIG. 1 is a block diagram illustrating an exemplary network-based transaction facility in the form of an internet-based auction facility.

FIG. 1 is block diagram illustration of an exemplary network-based transaction facility 100 in the form of an "Internet" network-based auction facility 110. While an exemplary embodiment of the present invention is described within the context of an auction facility, it will be appreciated by those skilled in the art that the invention will find application in many different types of computer-based, and network-based, commerce facilities.

The auction facility 110 includes one or more of a number of types of front-end servers, namely page servers 112 that deliver web pages (e.g., markup language documents), picture servers 114 that dynamically deliver images to be displayed within Web pages, listing servers 116, CGI servers 118 that provide an intelligent interface to the back-end of facility 110, and search servers 120 that handle search requests to the facility 110. Email servers 121 provide, inter alia, automated email communications to users of the facility 110. Auction facility 110 also includes administrative application(s) functions 128 for providing functions for applications running on auction facility 110.

The back-end servers include a database engine server 122, a search index server 124 and a credit card database server 126, each of which maintains and facilitates access to respective databases 123, 125, and 127, respectively.

The Internet-based auction facility 110 may be accessed by a client program 130, such as a browser (e.g., the Internet Explorer distributed by Microsoft Corp. of Redmond, Wash.) that executes on a client machine 132 and accesses the facility 110 via a network such as, for example, the Internet 134. Other examples of networks that a client may utilize to access the auction facility 110 include a wide area network (WAN), a local area network (LAN), a wireless network (e.g., a cellular network), or the Plain Old Telephone Service (POTS) network.

Database Structure

Figure 2:
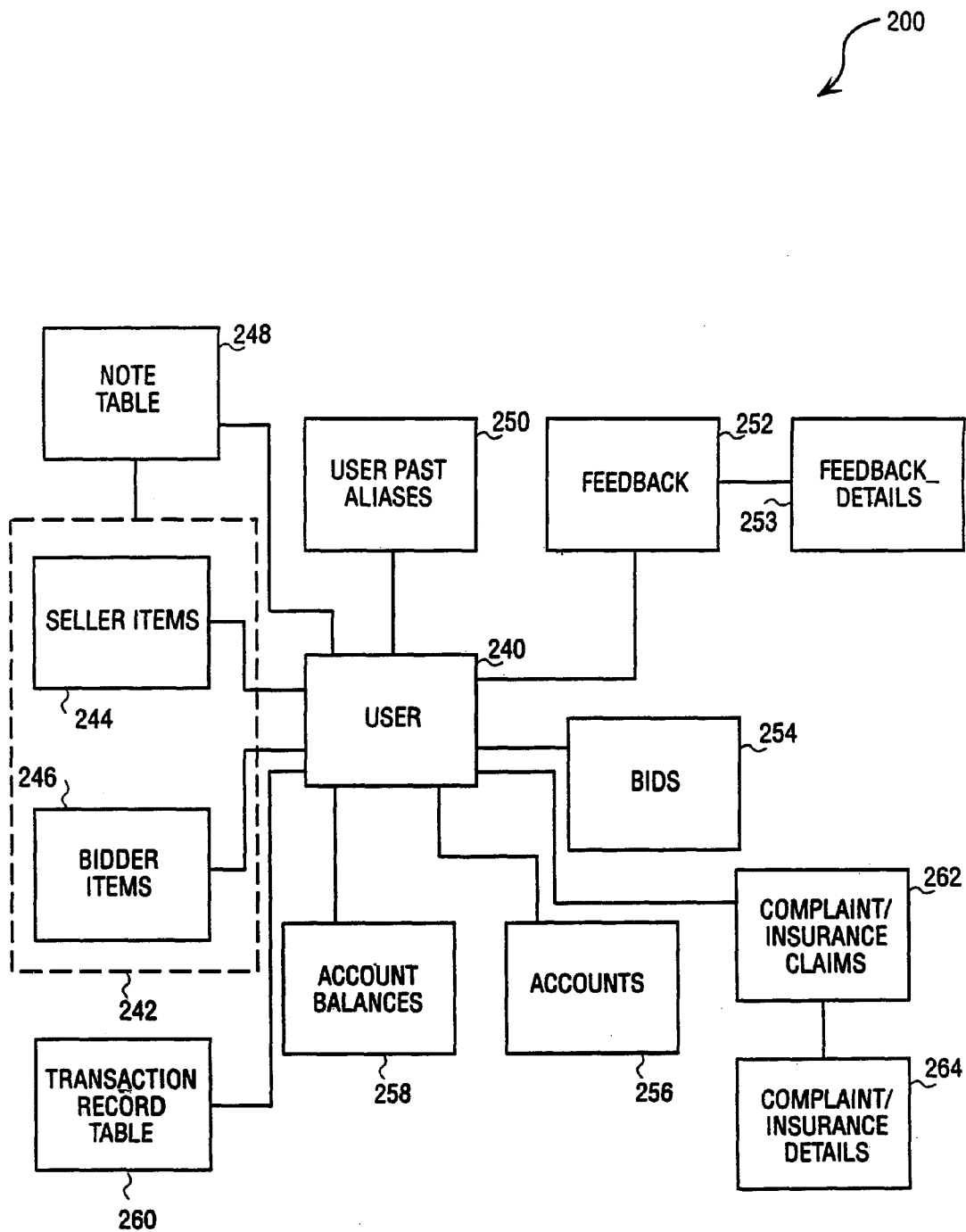
FIG. 2 is a database diagram illustrating an exemplary database for the transaction facility.

FIG. 2 is a database diagram illustration of an exemplary database 200, maintained by and accessed via the database engine server 122, which at least partially implements and supports the network-based auction facility 110. Database 123 may, in one embodiment, be implemented as a relational database, and includes a number of tables having entries, or records, that are linked by indices and keys. In an alternative embodiment, database 123 may be implemented as collection of objects in an object-oriented database.

Central to the database 123 is a user table 240, which contains a record for each user of the auction facility 210. A user may operate as a seller, buyer, or both, within auction facility 110. Database 123 also includes item tables 242 that may be linked to the user table 240. Specifically, tables 242 include a seller items table 244 and data items table 246. A user record in user table 240 may be linked to multiple items that are being, or have been, auctioned via auction facility 110. A link indicates whether the user is a seller or a bidder (or buyer) with respect to items for which records exist within the item tables 242. Database 123 also includes a note table 248 populated with note records that may be linked to one or more item records within the item tables 242 and/or to one or more user records within the user table 240. Each note record within the table 248 may include, inter alia, a comment, description, history or other information pertaining to an item being auction via auction facility 110, or to a user of auction facility 110.

A number of other tables are also shown to be linked to the user table 240, namely a user past aliases table 250, a feedback table 252, a feedback details table 253, a bids table 254, an accounts table 256, an account balances table 258, a transaction record table 260, a complaint/insurance claims table 262, and a complaint/insurance details table 264.

Complaint and Insurance Transaction Record Tables

FIGS. 3-9 are diagrammatic representations of exemplary embodiments of transaction record tables that are populated with records or entries for complaints and insurance claims relating to transactions (e.g., Internet based auction transactions) that have been facilitated by auction facility 110. Such transaction record tables may be stored in complaint/insurance claims table and/or complaint/insurance details table 264.

FIG. 3 is a diagrammatic representation of an exemplary fraud/insurance claim table 300 of the database illustrated in FIG. 2. Referring to FIG. 3, fraud/insurance claim table 300 includes item number column 312, complaintant column 314, complaintee column 316, contact info of complaintee column 318, date complaint filed column 320, tracking number of complaint column 322, and feedback ratings and nature of complaint column 324.

Item number column 312 stores item identifiers related to an item that is subject to a filed complaint. Complaintant column 314 stores the names of users who have filed a complaint for items identical in item number column 312. Complaintee column 316 stores names of users in which a complaint has been filed against. Contact information of complaintee column 318 stores information, which may be used to contact the complaintee. For example, such contact information may include an email address and/or mailing address or phone number of the complaintee.

Date complaint filed column 320 stores the times and dates a complaint is filed within auction facility 110. Tracking number of complaint column 322 stores tracking numbers that identify a filed complaint. The tracking number is used to track the status of a complaint. Feedback ratings and nature of a complaint column 324 stores information that describes the nature of the complaint, for example, how a fraud has been committed on a user.

FIG. 4 is a diagrammatic representation of an exemplary complaint type table 400 of the database illustrated in FIG. 2. Referring to FIG. 4, complaint type table 400 includes problem code column 474, problem description column 476, and problem type column 478.

Problem code column 474 stores a code number related to a type of problem description. Problem description column 476 stores description information relating to the complaint. For example, a common problem description may be "I sent the money for the item, but never received it." Problem type column 478 stores information used to tell whether the problem is specific to a buyer-bidder or a seller.

FIG. 5 is a diagrammatic representation of an exemplary contact information table of attorney generals 500 of the database illustrated in FIG. 2. Referring to FIG. 5, contact information table of attorney generals 500 includes an attorney general column 584, state column 586, and contact information column 588.

Attorney general column 584 stores names of attorney generals in specific states to contact in reporting fraud. That is, a user may contact an attorney general to describe specifically a fraud that has occurred against the user in a particular state. State column 586 stores the name of the state of the corresponding attorney general in the attorney general column 584. Contact information column 588 stores contact information for an attorney general in the attorney general column 584. Such contact information may include the mailing address, telephone number, or emailing address of an attorney general.

FIG. 6 is a diagrammatic representation of an exemplary comments table 600 of the database illustrated in FIG. 2. Comments table 600 may store comments placed by both parties in connection with a complaint. One record may be stored for each comment placed by each user. A limit on the number of comments may be placed for each user for each complaint. Referring to FIG. 6, comments table 600 includes tracking number column 620, user column 622, date of comment column 624, text of comment column 626, and registered customer column 628.

Tracking number column 620 stores tracking numbers that identifies filed complaints. User column 622 stores the names of users who have placed a comment in connection with a filed complaint associated with the tracking number stored in tracking number column 620. The user may be a bidder or a seller. Date of comment column 624 stores date and time information indicating when the comment was entered. Text of comment column 626 stores the text of a comment provided by a user in user column 622. For example, the user may provide information on how the user was defrauded in the online-auction transaction. Non-registered customer column 628 stores information relating to a non-registered commenting user of auction facility 110. For example, if the commenting user is not a registered user or the complaint is based on an item, which has been removed from the database, the email address of the commenting party may be placed here.

FIG. 7 is a diagrammatic representation of an exemplary address and passwords table 700 of the database illustrated in FIG. 2. Referring to FIG. 7, address and passwords table 700 includes email address column 720 and password column 722. Email address column 720 stores the email addresses of users involved with a complaint. Password column 722 stores the passwords corresponding to user email addresses in email address column 720.

Address and passwords table 700 may also store addresses and passwords of users who are not registered or cannot be found. Table 700 may also store information for users who cannot remember the user name of the other party in order to contact the other party. Table 700 may also store information to file claims on items that have been removed from the database.

FIG. 8 is a diagrammatic representation of an exemplary insurance claim table 800 of the database illustrated in FIG. 2. For one embodiment, item data is held for a limited amount of time (e.g., 30 days) and stores item data until the data is instructed to be taken off the database by auction facility 110.

Referring to FIG. 8, insurance claim table 800 includes item number column 820, claim number column 822, and data column 824. Item number column 820 includes item numbers related to filed complaints that have not been resolved. Claim number column 822 stores claim numbers that are associated with item numbers in item number column 820. Data column 824 stores information relating to the item, e.g., what type of item is the subject of a complaint, the final bid price for the item, and other types of item data.

FIG. 9 is a diagrammatic representation of an exemplary insurance claim details table 900 of the database illustrated in FIG. 2. Referring to FIG. 9, insurance claims table 900 includes claim number column 920, amount claimed column 922, and date of claim column 924.

Claim number column 920 stores claim numbers related to filed complaints that have not been resolved. Amount claim column 922 stores information on the amount of money lost resulting from an online-auction transaction conducted on auction-facility 110. Date of claim column 924 stores dates in which an insurance claim was filed.

The above record tables are used by network facility 110 to provide services such that users of network facility 110 may file complaints and to claim insurance for transactions conducted on network facility 110 in which a financial loss has occurred.

In the following operations, users are allowed to file a complaint of fraud on an item they have sold or bought on the network facility. The complained against party in the transaction is notified that a complaint has been filed against that party. The complained against party is allowed to go to the network facility to explain the allegations and to resolve the complaint with the complaining party. If at any time, the complaint is resolved, the complaining party may return to the site and indicate this fact. If, after a certain period of time, the complaint is not resolved, the complaining party is given information about government agencies to contact as well as information on filing an insurance claim if the certain criteria are met.

Filing a Complaint

Figure 10:
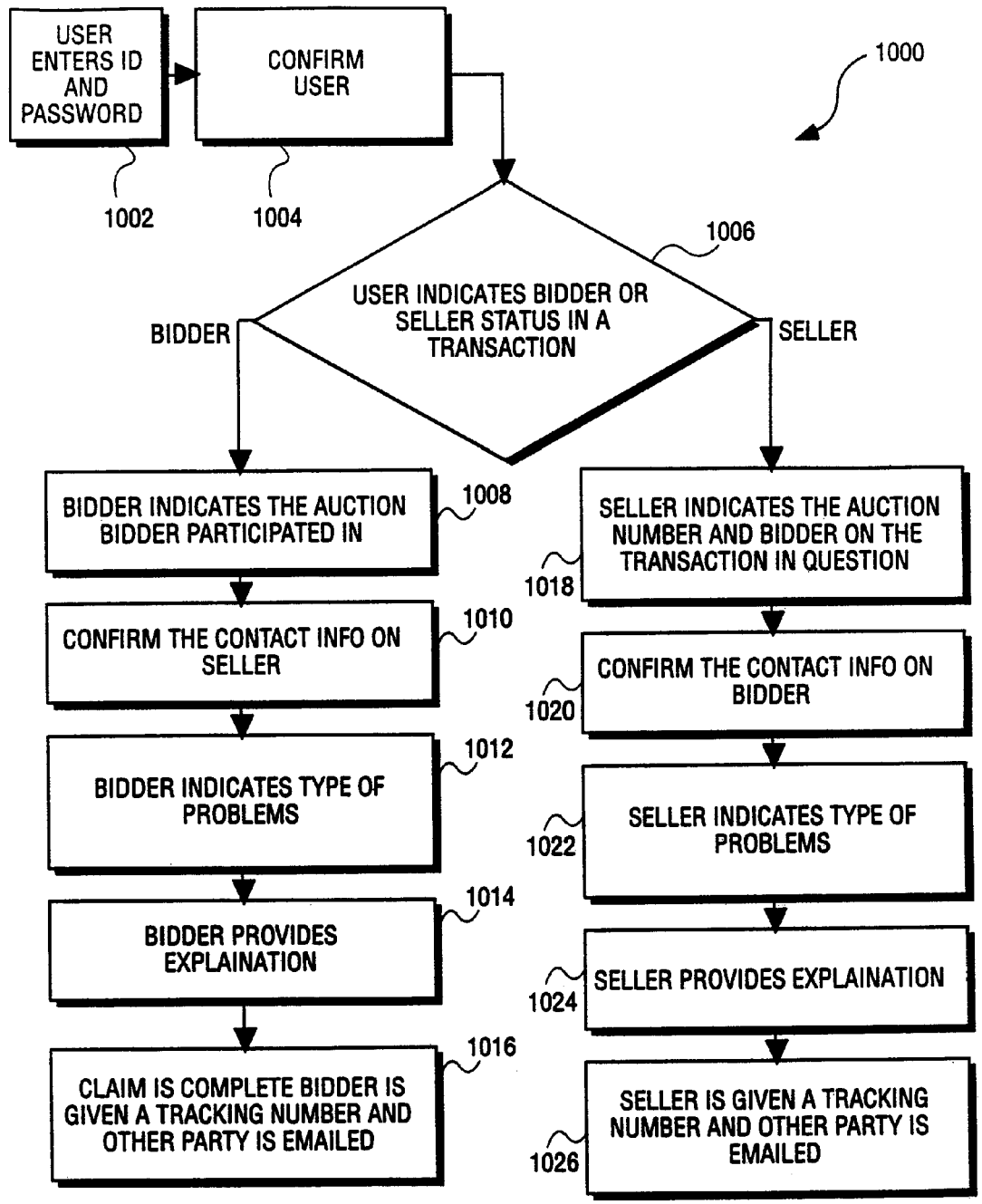
FIG. 10 is a flow chart illustrating an exemplary operation for allowing a user to file a claim or complaint facilitated by a network-based transaction facility.

FIG. 10 is a flow chart illustrating an exemplary operation 1000 for allowing a user to file a claim or complaint facilitated by a network-based transaction facility. The following exemplary operation 1000 allows a user to file a complaint of fraud on an item that has been sold or bought on network facility 110. The other party in the transaction may receive an email indicating that someone has claimed that the other party has committed a fraud.

Prior to a user filing a complaint, the user may be presented with various examples of when a complaint should be filed. For example, as shown in FIG. 11, auction facility 110 may provide a user with a screen 1100 giving the user examples of when to report fraud and claim insurance. Screen 1100 may include information regarding agencies or entities that may deal with fraud and provide insurance for network-based transactions.

Referring to FIG. 10, at operation block 1002, to begin filing a complaint regarding a network-based transaction, a user inputs a user ID and password to access the complaint filing section of the auction facility 110. The user ID and password is validated.

At operation block 1004, if the user ID and password is valid, network facility 110 provides the user with an interface that details contact information of the user and asks the user to confirm the contact information.

At operation block 1006, network facility 110 provides the user with an interface asking the user to indicate whether the user is a bidder or a seller in a transaction in which a complaint is to be filed.

Complaint by Bidder

At operation block 1008, if the user is a buyer or a bidder, the bidder indicates the item number of the transaction the user believes is fraudulent.

At operation block 1010, the bidder confirms the contact information of the seller who sold the item in question to validate that the information the bidder has on the seller is the same as the records stored in network facility 110.

At operation block 1012, the bidder indicates the type of problems that occurred in which the bidder considers fraudulent. Network facility 110 may provide an interface such as that shown in screen 1200 of FIG. 12. Screen 1200 provides common problems that a bidder may select to describe the transaction. For example, one common problem a bidder may select is "I sent a payment but never received any merchandise."

At operation block 1014, the bidder fills out a complaint form and provides an explanation of occurrences during the transaction. For example, network facility 110 may provide a complaint form interface 1300 as shown in FIG. 13. Complaint form interface 1300 may ask the user to input information related to the transaction and to provide a complete description of problem.

At operation block 1016, after the bidder completes the complaint form such as complaint form 1300, the complaint process is completed. Network facility 110 then creates a tracking number, which is associated with the filed complaint for users to use to track the status of the complaint. For example, network facility 110 may provide an interface 1400, as shown in FIG. 14, indicating a tracking number. Interface 1400 provides a user a tracking number 1402 and options for the user to select if the complaint is not resolved.

Complaint by Seller

The operations and interfaces provided to a seller who is claiming fraud is similar to the operations and interfaces provided to the bidder/buyer.

At operation block 1018, if the user is a seller, the seller indicates the item number of the transaction the seller believes is fraudulent.

At operation block 1020, the seller confirms the contact information of the bidder of the item in question to validate that the information the seller has on the bidder is the same as the records stored in network facility 110.

At operation block 1022, seller indicates the type of problems that occurred during the auction transaction that seller considers fraudulent. Network facility may provide an interface similar to screen 1200 of FIG. 12 for the seller to select common problems. For example, one common problem a seller may select is "I sent the item, but the payment was insufficient."

At operation block 1024, the seller provides an explanation of what occurred during the transaction. For example, network facility 110 may provide a complaint form interface such as interface 1300 of FIG. 13 that asks the user to input information to complete the complaint and to provide a complete description of the problem.

At operation block 1026, after the seller completes the complaint form such as complaint form 1300, the complaint is completed. Network facility 110 creates a tracking number in connection with the filed complaint for users to use to track the status of the complaint. For example, network facility 110 may provide an interface 1400 indicating a tracking number.

Complaint Status/Comments

The following operation 1000 allows users to resolve complaints by providing a messaging board where both parties may comment back-and-forth about the transaction in question and to resolve a complaint. Such operations may provide the messaging board for a certain period of time (e.g., 14 days or two weeks), and, if the complaint is not resolved, such operations may provide information to the users on contacting government agencies to deal with the fraud as well as information on filing an insurance claim.

Figure 15:
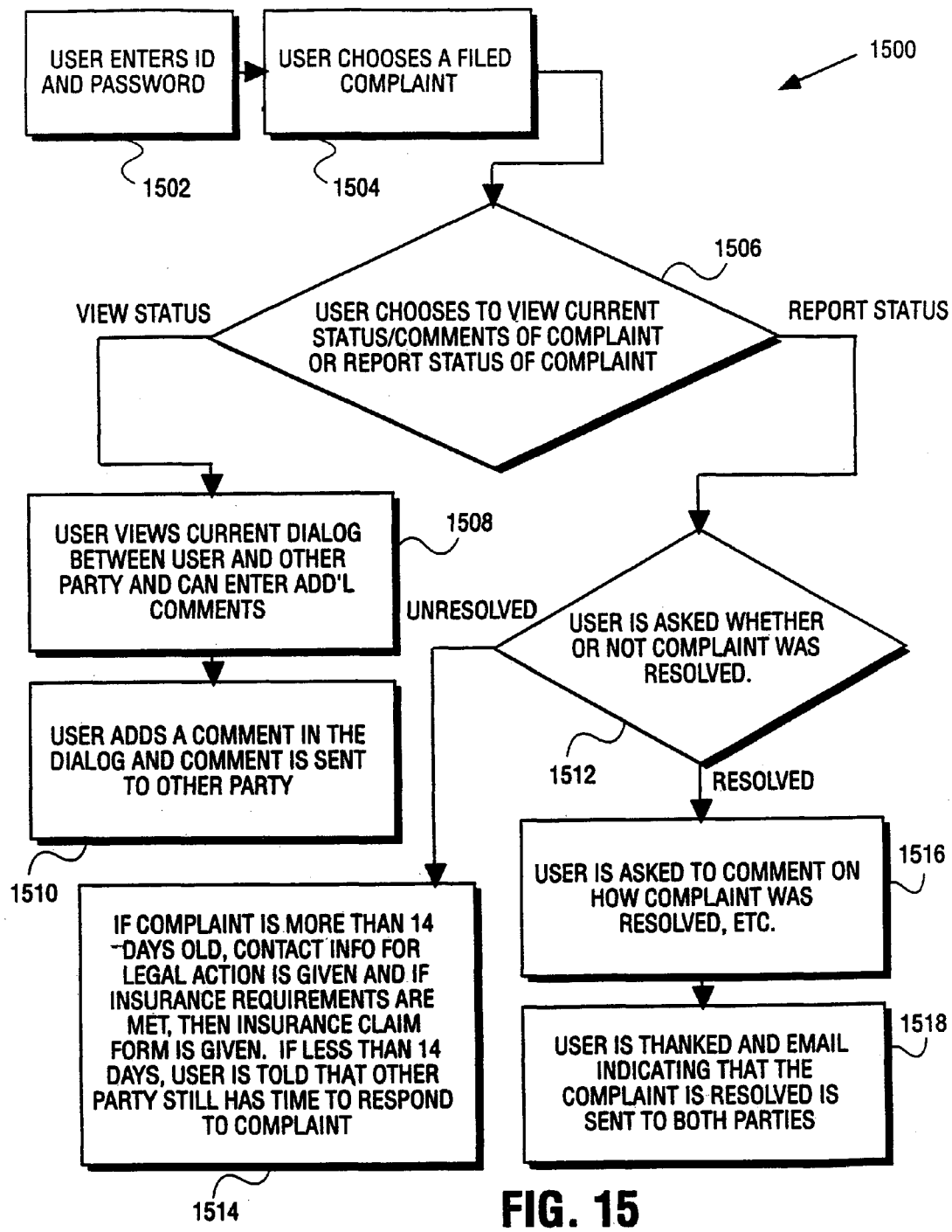
FIG. 15 is a flow chart illustrating an exemplary operation allowing users to view the status of a claim or to provide comments to a complaint.

FIG. 15 is a flow chart illustrating an exemplary operation 1500 allowing users to view the status of a claim or to provide comments to a complaint.

Referring to FIG. 15, at operation block 1502, a user inputs a user ID and password to access information regarding a filed complain within network facility 110. The user ID and password are validated by network facility 110. At this point, the user may be a bidder or a seller who has filed a complaint or complaints.

At operation block 1504, if the user ID and password are valid, network facility 110 provides the user and interface listing complaints and status of complaints the user has filed. For example, network facility may provide interface 1600 as shown in FIG. 16 to the user. Interface 1600 lists tracking numbers of complaints and the status of the complaints. In the example of interface 1600, a complaint associated with the tracking number 2629 has not been resolved.

Figure 17:
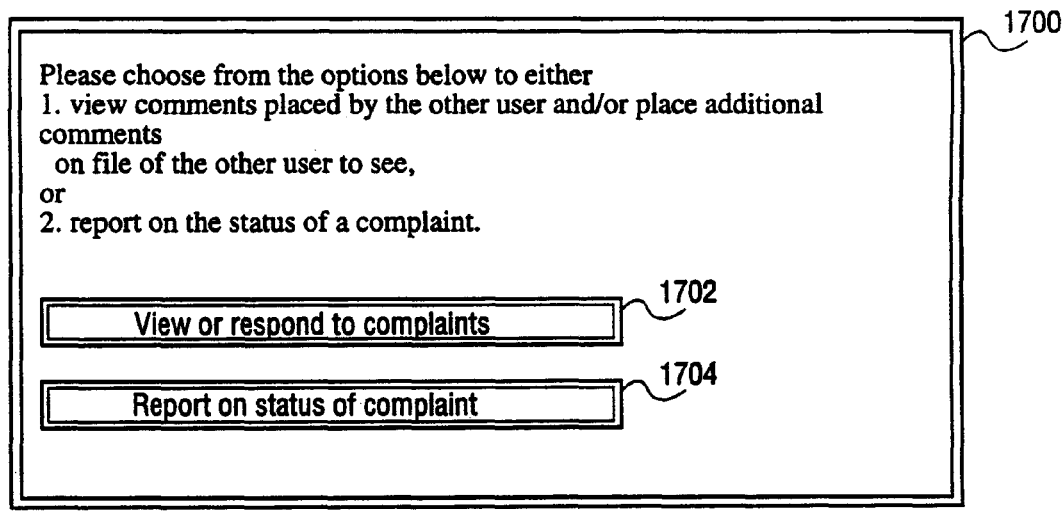
FIG. 17 illustrates an exemplary interface allowing a user to select to view or respond to a claim or report status of a complaint.

At operation block 1506, network facility 110 provides the user with interface to allow the user to choose to view current status/provide comments to a filed complaint or report the status of a filed complaint. For example, network facility 110 may provide the user with interface 1700 as shown in FIG. 17.

In the example of interface 1700, the user may select option 1702 to "View or respond to complaints" or option 1704 to "Report status of complaint."

View Status or Respond to Complaint

At operation block 1508, if the user selects to view or respond to complaints, network facility 110 provides an interface for the user to view current dialog between the user and other party and can enter additional comments. For example, network facility 110 may provide an interface 1800 as shown in FIG. 18. In the example of interface 1800, a user may view all comments related to a complaint in window 1802.

At operation block 1510, the user may enter additional comments so that the other user may view in window 1804 of interface 1800. This operation is optional.

Report Status of Complaint

Figure 19:
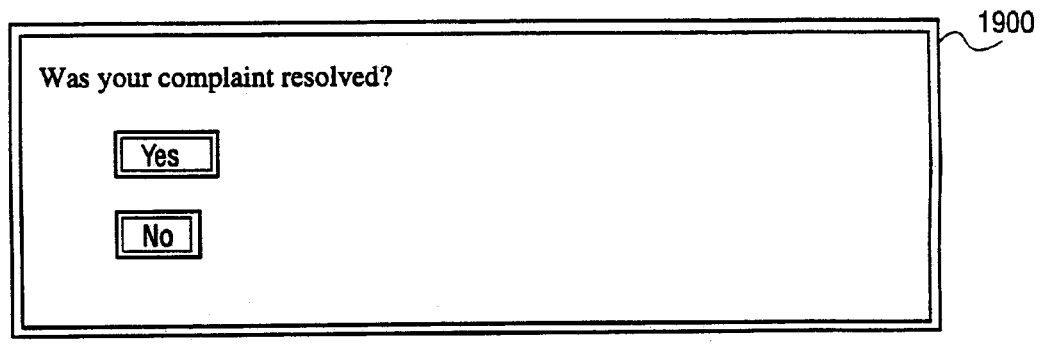
FIG. 19 illustrates an exemplary interface allowing user to indicate if a complaint is resolved.

At operation block 1512, if the user selects to report the status of a complaint, network facility 110 provides an interface asking the user whether the complaint has been resolved. For example, network facility 110 may provide interface 1900 as shown in FIG. 19 allowing the user to select "Yes" if the complaint has been resolved and "No" if the complaint has not been resolved.

Figure 20:
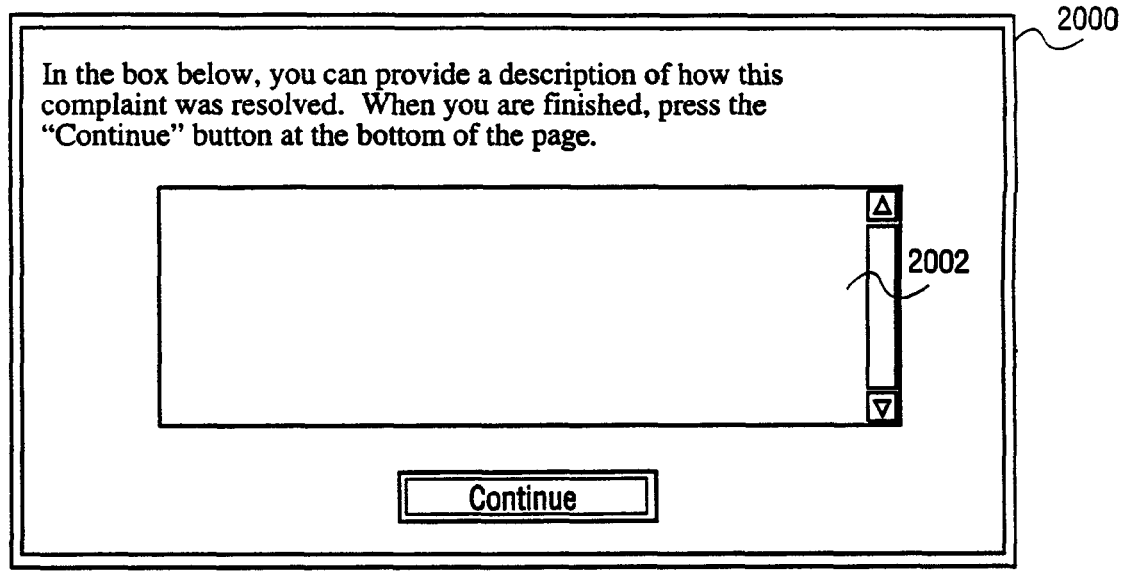
FIG. 20 illustrates an exemplary interface allowing a user to explain how a complaint was resolved.

At operation block 1516, if the user selects that the complaint has been resolved, network facility 110 may provide an interface to allow the user to describe how the complaint was resolved. For example, network facility 110 may provide interface 2000 as shown in FIG. 20 allowing the user to explain how the complaint was resolved. In the example of interface 2000, a user may input the explanation in widow 2002.

At operation 1518, network facility 110 provides an interface thanking the user and sends emails to the users involved with complaint indicating that the complaint is resolved.

At operation block 1514, if the complaint is unresolved and more than 14 days old, contact information for legal services is given, and if insurance requirements are met, an insurance claim form is given. If, however, the complaint is less than 14 days old, the user is told that the other party still has time to respond to the complaint. For example, after the 14 day period, network facility 110 may provide an interface 2100 as shown in FIG. 21 providing the user with attorney general information to file a complaint.

If after the 14 day period, interface 2100 may allow the user to fill out an insurance claim form either online or to obtain a printable insurance form if certain criteria are met. Exemplary criteria may be:

Request occurs within 45 day of auction end data;
Buyer and seller feedback >0 at time of complaint;
Final bid amount is >$25.00 dollars; and
Users may file no more than one insurance claim per month for the first six months.

Responding to a Complaint

The following operation allows the other party in a transaction in which a complaint has been filed to go to the facility and provide their explanation of the events that have transpired.

Figure 22:
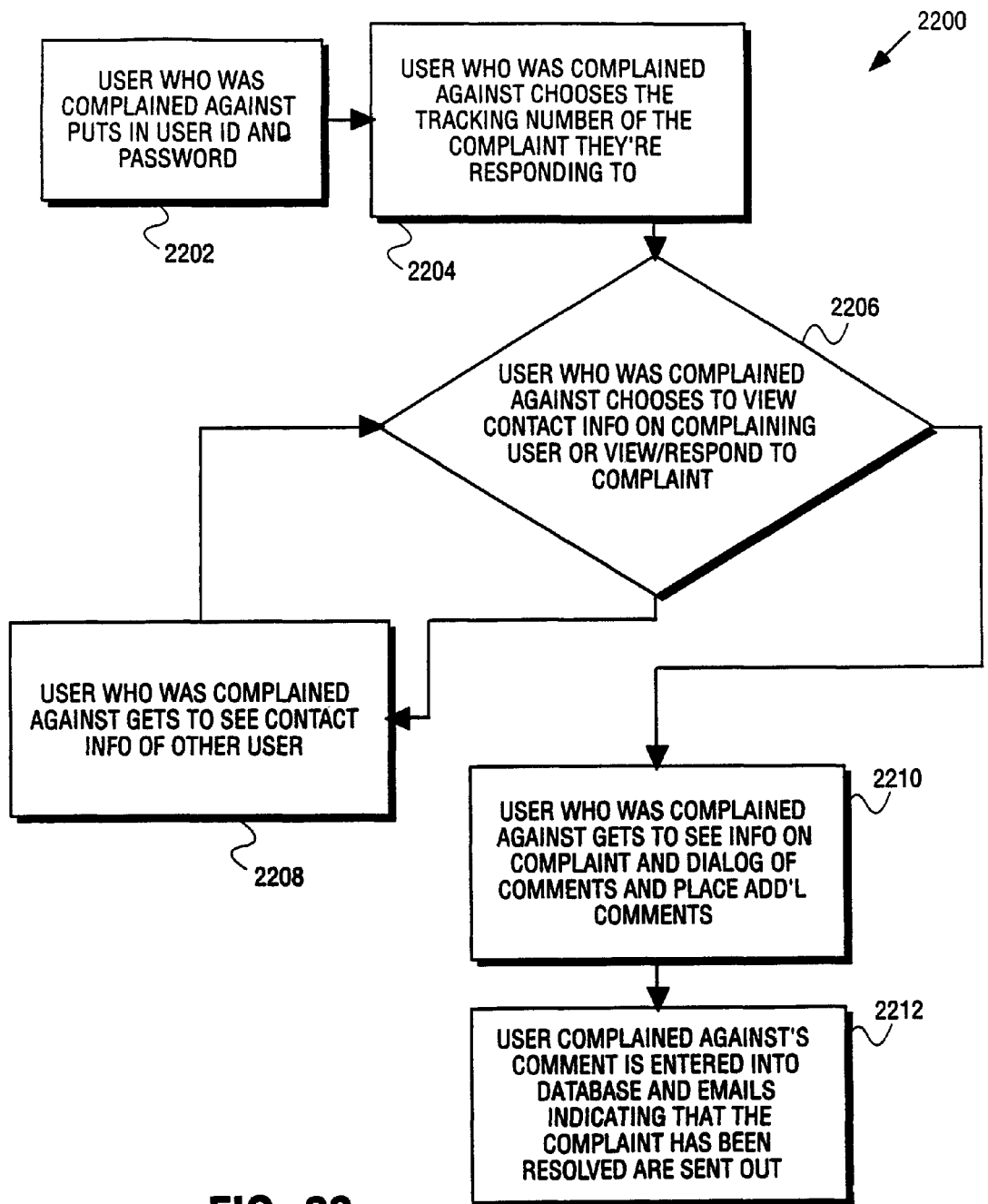
FIG. 22 is a flow chart illustrating an exemplary operation allowing a user who identified as committing fraud to view the complaint against the user and provide comments.

FIG. 22 is a flow chart illustrating an exemplary operation 2200 allowing a user who is identified as committing fraud to view the complaint against the user and to provide comments.

Referring to FIG. 22, at operation block 2202, a user who was complained against enters a user ID and password. Network facility 110 validates the user ID and password. If the user ID and password are valid, network facility 110 allows the user to proceed to operation block 2204.

Figure 23:
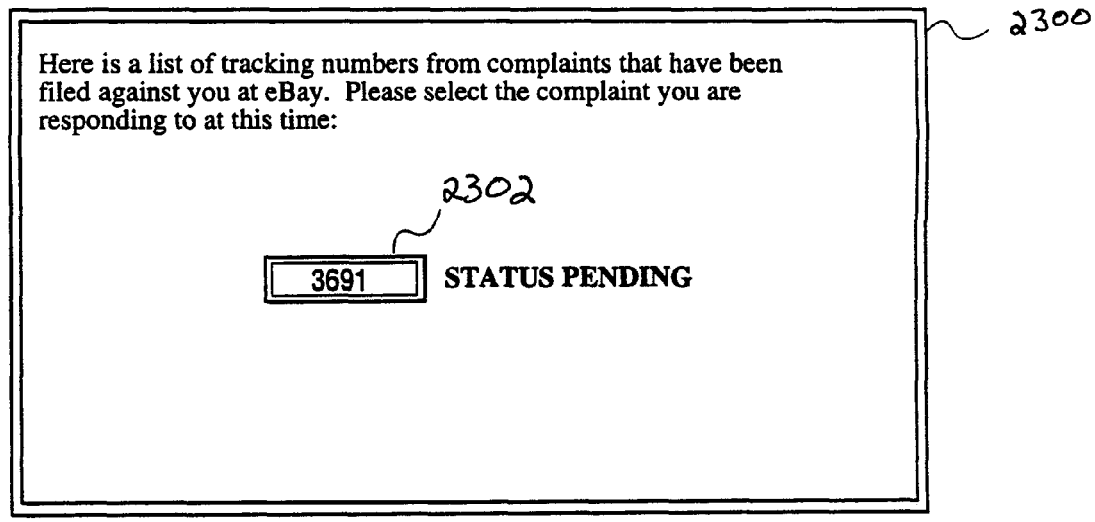
FIG. 23 illustrates an exemplary interface providing a user who is identified as committing fraud options to view or respond to a complaint or obtain contact information of the party who filed the complaint.

At operation block 2204, network facility provides the user with an interface to choose a tracking number of a complaint in providing a response. For example, network facility 110 may provide interface 2300 as shown in FIG. 23 listing tracking number of complaint that have been filed against the user. In the example of interface 2300, one complaint is listed 2302 to choose.

Figure 24:
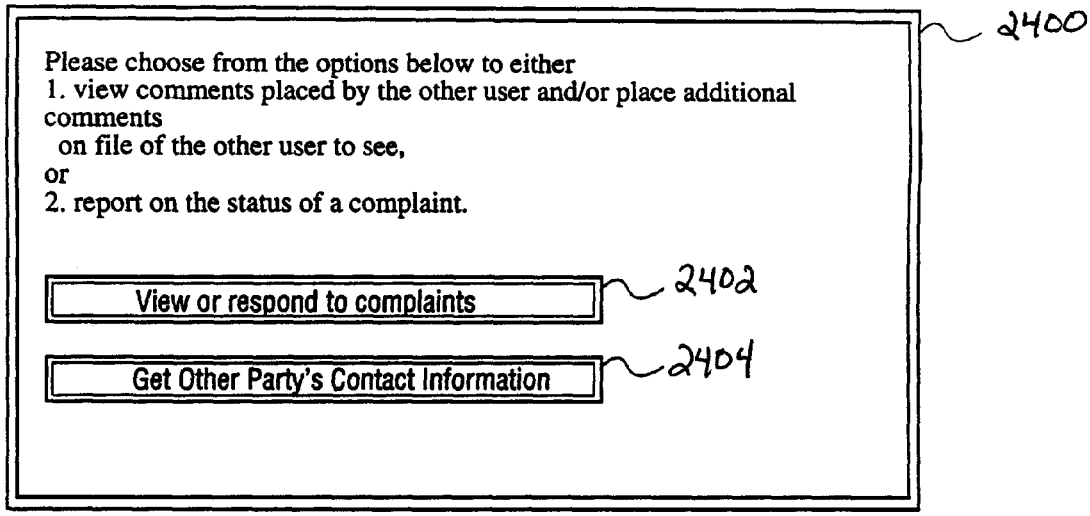
FIG. 24 illustrates an exemplary interface providing a user a list of tracking numbers of complaints against the user.

At operation block 2206, network facility 110 provides an interface to the user such that the user who was complained against can choose to view contact information on complaining user or view/respond to the complaint. For example, network facility 110 may provide interface 2400 as shown in FIG. 24 that provides option 2402 to "View or respond to complaints" or option 2404 "Get other Party's Contact Information."

At operation block 2208, if the user who was complained against chooses to view the contact information of the other user, network facility 110 provides an interface allowing the user to view the contact information of the other user. For example, network facility may provide an interface 2500 as shown in FIG. 25 that allows the user who was complained against to view the complaining user's contact information.

At operation block 2210, if the user selects to view/respond to complaint, network facility 110 provides an interface that allows the user to see information regarding the complaint, to view dialog of comments, and to place additional comments. For example, network facility 110 may provide interface 2600 as shown in FIG. 26 that allows the complained against user to view comments in window 2602 and allows the user to add additional comments in window 2604.

At operation block 2212, if the user inputs additional comments, network facility enters the additional comments into the database. The user may indicate that the complaint has been resolved. In such a case, network facility 110 will send emails to the complaining user that the complained against user has indicated that the complaint has been resolved.

Exemplary Computing System

Figure 27:
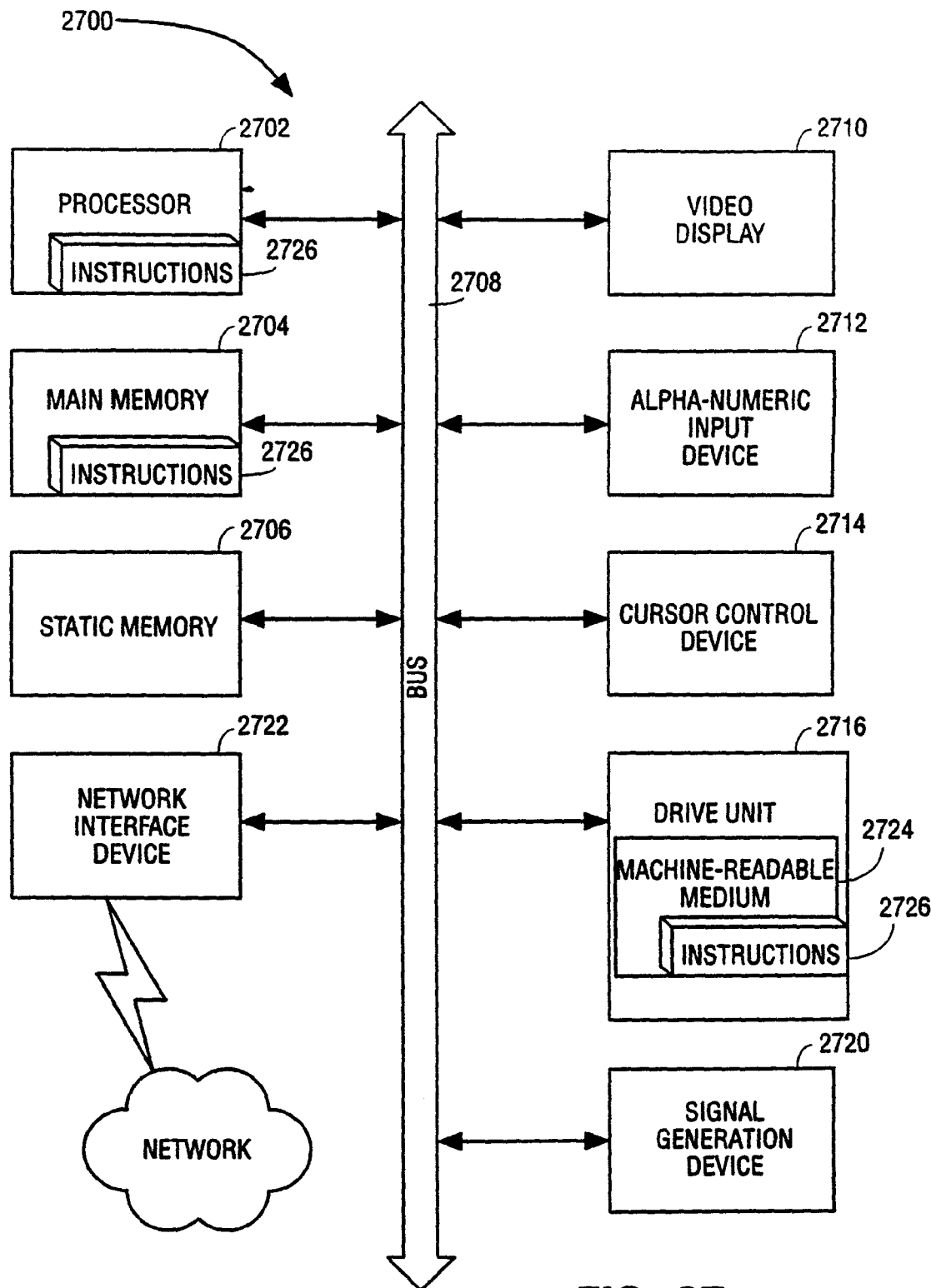
FIG. 27 is a diagrammatic representation of a machine, in an exemplary form of a computer system, in which a set of instructions for causing the machine to perform any of the methodologies of the present invention may be executed.

FIG. 27 is a diagrammatic representation of a machine, in an exemplary form of a computer system 2700, in which a set of instructions for causing the machine to perform any of the methodologies of the present invention may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 2700 includes a process 2702, a main memory 2704 and a static memory 2706, which communicate with each other via a bus 2708. The computer system 2700 may further include a video display unit 2710 (e.g., a liquid crystal display (LCD) or a cathode ray tube (CRT)). The computer system 2700 also includes an alpha-numeric input device 2712 (e.g., a keyboard), a cursor control device 2714 (e.g., a mouse), a disk drive unit 2716, a signal generation device 2720 (e.g., a speaker) and a network interface device 2722.

The disk drive unit 2716 includes a machine-readable medium 2724 on which is stored a set instructions (i.e., software) 2726 embodying any one, or all, of the methodologies described above. The software 2726 is also shown to reside, completely or at least partially, within the main memory 2704 and/or within processor 2702. The software 2726 may further be transmitted or received via the network interface device 2722. For purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not limited to, solid-state memories, optical and magnetic disks, and carrier wave signals.

Thus, a method and system for reporting fraud and claiming insurance related to network-based transactions have been described. Although, the present invention has been described with reference to specific exemplary embodiments, it will be evident that various modifications and changes may be made to these embodiments without departing from the broader spirit and scope of the invention. Accordingly, the specification and drawings are to be regarded in an illustrate rather than a restrictive sense.

The invention claimed is:

1. A method comprising:
receiving, at a server operated by a third party, data representing a complaint from a first party regarding a transaction with a second party;
notifying, via the server, the second party, the notifying including sending information about the complaint received from the first party to the second party;
hosting, on the server, a forum enabling the first party and the second party to exchange information related to the complaint;
monitoring, using one or more processors on the server, the forum for information entries from the first party and the second party in reference to the complaint; and
determining, using the one or more processors on the server, based at least in part on the monitoring whether the first party has complied with a criterion required to receive compensation in reference to the complaint.

2. The method of claim 1, further comprising receiving, at the server, a request for compensation based on the complaint; and
wherein the determining whether the first party has complied with the criterion required to receive compensation includes evaluating the request for compensation.

3. The method of claim 2, wherein the determining whether the first party has complied with the criterion includes determining that the first party has not exceeded a number of requests for compensation within a certain time period.

4. The method of claim 2, wherein the receiving the request for compensation includes receiving an insurance claim form, the insurance claim form including information necessary to satisfy the criterion required to receive compensation.

5. The method of claim 1, wherein the determining whether the first party has complied with the criterion includes determining whether the complaint involves potential fraud by the second party.

6. The method of claim 5, wherein the determining whether the complaint involves potential fraud includes selecting a form of fraud from the following group of fraudulent activities:
the second party receiving payment but failing to deliver a purchased item;
the second party delivering a defective item;
the second party delivering an item that differs from an advertised item; and
the second party delivering a counterfeit item.

7. The method of claim 1, wherein the determining whether the first party has complied with the criterion includes determining that the complaint has been open for a pre-determined time period.

8. The method of claim 1, wherein the determining whether the first party has complied with the criterion includes determining that the value of the transaction transgressed a certain threshold amount.

9. The method of claim 1, wherein the hosting the forum includes maintaining a status indicator associated with the complaint.

10. A machine-readable storage device including instructions that, when executed by a machine, cause the machine to:
receive data representing a complaint from a first party regarding a transaction with a, second party;
send a notification to the second party, the notification including information about the complaint received from the first party;
host a forum to enable the first party and the second party to exchange information related to the complaint;
monitor the forum for information entries from the first party and the second party in reference to the complaint; and
determine, based at least in part on the monitored forum entries, whether the first party has complied with a criterion required to receive compensation in reference to the complaint.

11. The machine-readable storage device of claim 10, further comprising instructions that cause the machine to receive a request for compensation based on the complaint; and
wherein the instructions that cause the machine to determine whether the first party has complied with the criterion required to receive compensation include instructions that cause the machine to evaluate the request for compensation.

12. The machine-readable storage device of claim 11, wherein the instructions that cause the machine to determine whether the first party has complied with the criterion required to receive compensation include instructions that cause the machine to determine that the first party has not exceeded a number of requests for compensation within a certain time period.

13. The machine-readable storage device of claim 11, wherein the instructions that cause the machine to receive the request for compensation include instructions that cause the machine to receive an insurance claim form, the insurance claim form including information necessary to satisfy the criterion required to receive compensation.

14. The machine-readable storage device of claim 10, wherein the instructions that cause the machine to determine whether the first party has complied with the criterion required to receive compensation include instructions that cause the machine to determine whether the complaint involves potential fraud by the second party.

15. The machine-readable storage device of claim 14, wherein the instructions that cause the machine to determine whether the complaint involves potential fraud include instructions that cause the machine to select a form of fraud from the following group of fraudulent activities:
the second party receiving payment but failing to deliver a purchased item;
the second party delivering a defective item;
the second party delivering an item that differs from an advertised item; and
the second party delivering a counterfeit item.

16. The machine-readable storage device of claim 10, wherein the instructions that cause the machine to determine whether the first party has complied with the criterion required to receive compensation include instructions that cause the machine to determine that the complaint has been open for a pre-determined time period.

17. The machine-readable storage device of claim 10, wherein the instructions that cause the machine to determine whether the first party has complied with the criterion required to receive compensation include instructions that cause the machine to determine that the value of the transaction transgressed a certain threshold amount.

18. The machine-readable storage device of claim 10, wherein the instructions that cause the machine to host the forum include instructions that cause the machine to maintain a status indicator associated with the complaint.

19. A system comprising:
   a database configured to store information detailing a complaint regarding a transaction between a first party and a second party, and information describing actions performed by the first party and the second party to resolve the complaint; and
   a server including one or more processors and a communication interface to the database, the server configured to:
      receive, electronically over a network connection, data representing the complaint from the first party;
      store, in the database, the data representing the complaint received from the first party;
      send, electronically over the network connection, a notification to the second party detailing the complaint received from the first party;
      receive, electronically over the network connection, a plurality of entries associated with the complaint, the plurality of entries including at least one entry from each of the first party and the second party;
      store, in the database, the plurality of entries associated with the complaint; and
      evaluate, using the one or more processors, the complaint and the plurality of entries to determine whether the first party has complied with a criterion required to receive compensation in reference to the complaint.

20. The system of claim 19, wherein the server is configured to evaluate the complaint the plurality of entries based on at least one of the following criteria:
   a pre-determined time period has elapsed since receiving the complaint;
   a value threshold has been transgressed;
   a pre-determined number of entries have been received; and
   a maximum number of complaints from the first party has not been exceeded.

* * * * *

UNITED STATES PATENT AND TRADEMARK OFFICE
CERTIFICATE OF CORRECTION

| | |
|---|---|
| PATENT NO. | : 8,438,050 B2 |
| APPLICATION NO. | : 13/523461 |
| DATED | : May 7, 2013 |
| INVENTOR(S) | : Leonardo et al. |

It is certified that error appears in the above-identified patent and that said Letters Patent is hereby corrected as shown below:

In the Claims:

In column 12, line 16, in Claim 10, delete "a," and insert --a--, therefor

In column 14, line 18, in Claim 20, before "the", insert --and--, therefor

Signed and Sealed this
Third Day of September, 2013

Teresa Stanek Rea
*Acting Director of the United States Patent and Trademark Office*